United States Patent
Tseng (10) Patent No.: US 8,687,603 B2
(45) Date of Patent: *Apr. 1, 2014

(54) METHOD FOR IMPROVING DISCONTINUOUS RECEPTION FOR A WIRELESS COMMUNICATION SYSTEM AND RELATED COMMUNICATION DEVICE

(71) Applicant: Innovative Sonic Limited, Port Louis (MU)

(72) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,715

(22) Filed: Dec. 13, 2012

(65) Prior Publication Data

US 2013/0100796 A1    Apr. 25, 2013

Related U.S. Application Data

(63) Continuation of application No. 12/326,913, filed on Dec. 3, 2008, now Pat. No. 8,340,052.

(60) Provisional application No. 60/992,672, filed on Dec. 5, 2007.

(51) Int. Cl.
*H04B 7/216*    (2006.01)

(52) U.S. Cl.
USPC .......................... 370/335; 370/328; 370/329

(58) Field of Classification Search
USPC .............. 370/311, 328, 335, 342, 389, 395.4, 370/432, 441, 449–451, 454, 458–459, 479
See application file for complete search history.

(56) References Cited

U.S. PATENT DOCUMENTS

| | | | | |
|---|---|---|---|---|
| 6,901,063 | B2 * | 5/2005 | Vayanos et al. | 370/335 |
| 7,356,099 | B2 * | 4/2008 | Lee | 375/342 |
| 7,525,944 | B2 * | 4/2009 | Vayanos et al. | 370/342 |
| 8,295,839 | B2 * | 10/2012 | Terry | 455/436 |
| 8,340,052 | B2 * | 12/2012 | Tseng | 370/335 |
| 2002/0071407 | A1 * | 6/2002 | Koo et al. | 370/335 |
| 2002/0172208 | A1 * | 11/2002 | Malkamaki | 370/400 |
| 2005/0163161 | A1 * | 7/2005 | Wei et al. | 370/469 |
| 2007/0286080 | A1 * | 12/2007 | Kim et al. | 370/236 |
| 2008/0186892 | A1 * | 8/2008 | Damnjanovic | 370/311 |
| 2009/0046627 | A1 * | 2/2009 | Xu | 370/328 |
| 2009/0046650 | A1 * | 2/2009 | Dalsgaard et al. | 370/329 |
| 2009/0103500 | A1 * | 4/2009 | Malkamaki et al. | 370/336 |

* cited by examiner

*Primary Examiner* — Kevin Mew
(74) *Attorney, Agent, or Firm* — Blue Capital Law Firm, P.C.

(57) ABSTRACT

A method for improving discontinuous reception for a user equipment of a wireless communication system includes separately managing retransmission reception time limits of a plurality of downlink hybrid automatic repeat request (DL HARQ) processes when the discontinuous reception is used in the plurality of DL HARQ processes.

8 Claims, 8 Drawing Sheets

METHOD FOR IMPROVING DISCONTINUOUS RECEPTION FOR A WIRELESS COMMUNICATION SYSTEM AND RELATED COMMUNICATION DEVICE

CROSS-REFERENCE TO RELATED APPLICATIONS

This application is a Continuation of U.S. patent application Ser. No. 12/326,913, filed on Dec. 3, 2008, which claims the benefit of U.S. Provisional Application Ser. No. 60/992,672, filed Dec. 5, 2007, the entire disclosures of which are incorporated herein by reference.

FIELD

The present invention relates to a method and related communication device and more particularly, to a method for improving discontinuous reception corresponding to hybrid automatic repeat request (HARQ) processes for a wireless communication system and related communication device.

BACKGROUND

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS (Quality of Service) requirements simultaneously, providing diverse flexible two-way transmission services and better communication quality to reduce transmission interruption rates.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simpler.

The MAC layer of a user equipment (UE) includes a Hybrid Automatic Repeat Request (HARQ) entity which can simultaneously execute a plurality of HARQ processes for parallel data transmissions.

According to the structure of LTE system, Discontinuous Reception (DRX) is applied to the MAC layer for allowing UE to enter a standby mode during certain periods and stopping monitoring a Physical down Link Control Channel (PD-CCH).

Regarding a Down Link Hybrid Automatic Repeat Request (DL HARQ) process, a Hybrid Automatic Repeat Request Round Trip Time (HARQ RTT) timer is used for providing a certain amount of consecutive Transmission Time Intervals (TTIs) during which the UE enters the standby mode. After the TTIs, the UE executes a retransmission detection of a specified DL HARQ process. In this application, HARQ RRT timer is hereinafter abbreviated as round trip time (RTT) timer for easy studying purpose.

Apart from that, a DRX retransmission timer is used for providing a certain amount of TTIs during which UE waits for a retransmission packet of the DL HARQ process. When receiving the retransmission packet during the TTI period, the UE instantly stops the DRX retransmission timer. Contrarily, the UE enters the standby mode when not receiving any retransmission packet during the TTI period.

According to the prior art, missing of a retransmission packet occurs when the UE uses only one DRX retransmission timer to manage retransmission reception timings of multiple DL HARQ processes.

Figure 1:
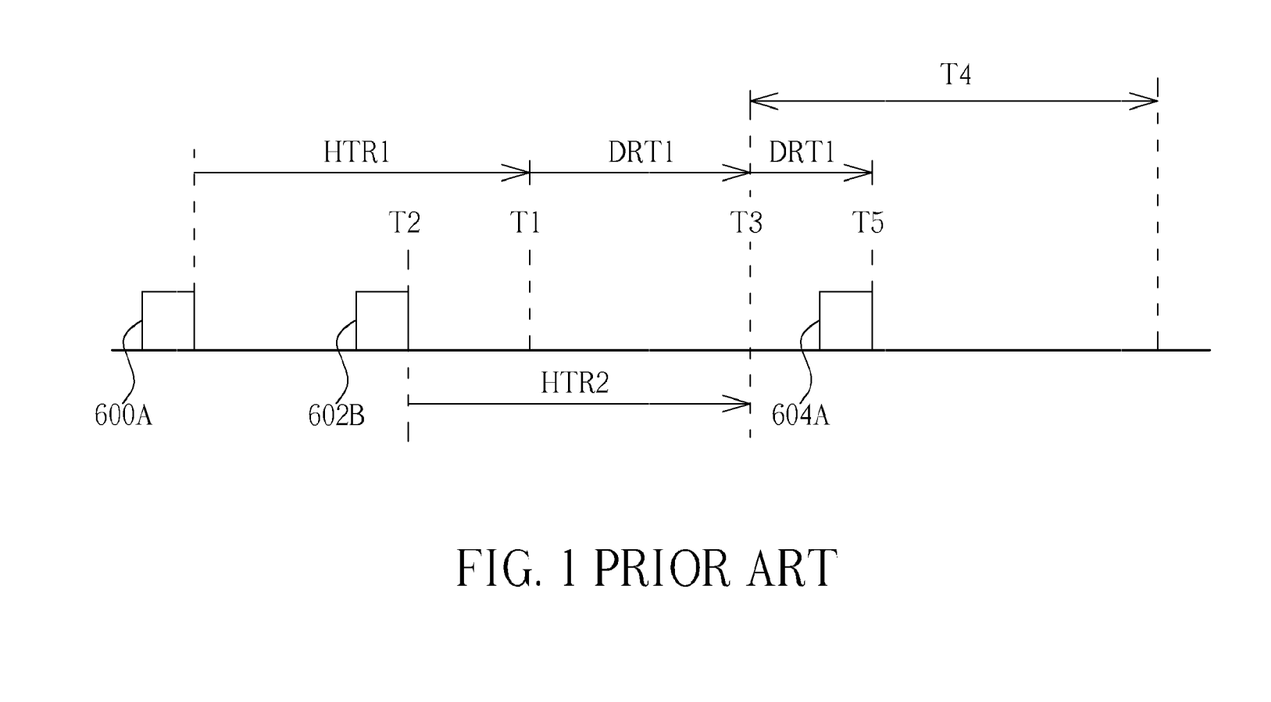
FIG. 1 is a schematic diagram of a retransmission detection timing management according to the prior art.

Please refer to FIG. 1, which is a schematic diagram of retransmission detection timing of a DL HARQ process managed by a UE according to the prior art. The UE uses DL HARQ processes A and B to receive packets 600A and 602B, respectively. The suffixes A and B of the packet 600A and 602B represent exactly which DL HARQ process they belong to. When the UE detects the packet 600A, a RTT timer HTR1 starts running. When the RRT timer HTR1 expires at time T1, a DRX retransmission timer DRT1 is started and provides a retransmission reception time T4 for the UE. When the packet 602B is detected, the UE starts a RTT timer HTR2. When the RTT timer HTR2 expires at time T3, the UE restarts the DRX retransmission tinier DRT1 because the DRX retransmission timer DRT1 is still running. When a retransmission packet 604A of the packet 600A is received at time T5, the UE stops the DRX retransmission timer DRT1 and enters the standby mode. In this situation, UE will miss a retransmission packet of the packet 602B.

SUMMARY

Therefore, the present invention provides a method for improving discontinuous reception for user equipment of a wireless communication system and related communication device for preventing missing a retransmission packet.

The present invention discloses a method for improving discontinuous reception for a user equipment of a wireless communication system. The method includes separately managing retransmission reception timings of a plurality of downlink hybrid automatic repeat request (DL HARQ) processes when the discontinuous reception is used in the plurality of DL HARQ processes.

The present invention further discloses a communication device, of a wireless communication system for improving discontinuous reception to prevent missing a retransmission packet. The communication device includes a processor and a storage device. The processor is used for executing a process. The storage device is coupled to the processor and used for storing a program for executing the process. The process comprises separately managing retransmission reception timings of a plurality of DL HARQ processes when the discontinuous reception is used in the plurality of DL HARQ processes.

The present invention further discloses a method for improving discontinuous reception for a user equipment of a wireless communication system. The user equipment controls retransmission reception timings of a plurality of DL HARQ processes by use of a discontinuous reception retransmission timer (DRX retransmission timer). The method comprises when receiving a retransmission packet of a first DL HARQ process of the plurality of DL HARQ processes during a running state of the DRX retransmission timer, determining a state of packet data stored in a buffer, which is used for storing packet data related to the plurality of DL HARQ processes, keeping the running state of DRX retransmission timer when determining that the packet data stored in the buffer includes decoding failure data which does not belong to the first DL HARQ process, and stopping the DRX retransmission timer when determining that the packet data stored in the buffer does not include the decoding failure data which does not belong to the first DL HARQ process.

The present invention further discloses a communication device of a wireless communication system for controlling retransmission reception timings of a plurality of DL HARQ processes by use of a DRX retransmission timer for improving discontinuous reception to prevent missing a retransmission packet. The communication device includes a control circuit, a processor and a storage device. The control circuit is used for realizing functions of the communication device. The processor is installed in the control circuit and used for executing a process to command the control circuit. The storage device is installed in the control circuit, coupled to the processor, and used for storing a program for executing the process. The process comprises when receiving a retransmission packet of a first DL HARQ process of the plurality of DL HARQ processes during a running state of the DRX retransmission timer, determining a state of packet data stored in a buffer, which is used for storing packet data related to the plurality of DL HARQ processes, keeping the running state of DRX retransmission timer when determining that the packet data stored in the buffer includes decoding failure data which does not belong to the first DL HARQ process and stopping the DRX retransmission timer when determining that the packet data stored in the buffer does not include the decoding failure data which does not belong to the first DL HARQ process.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
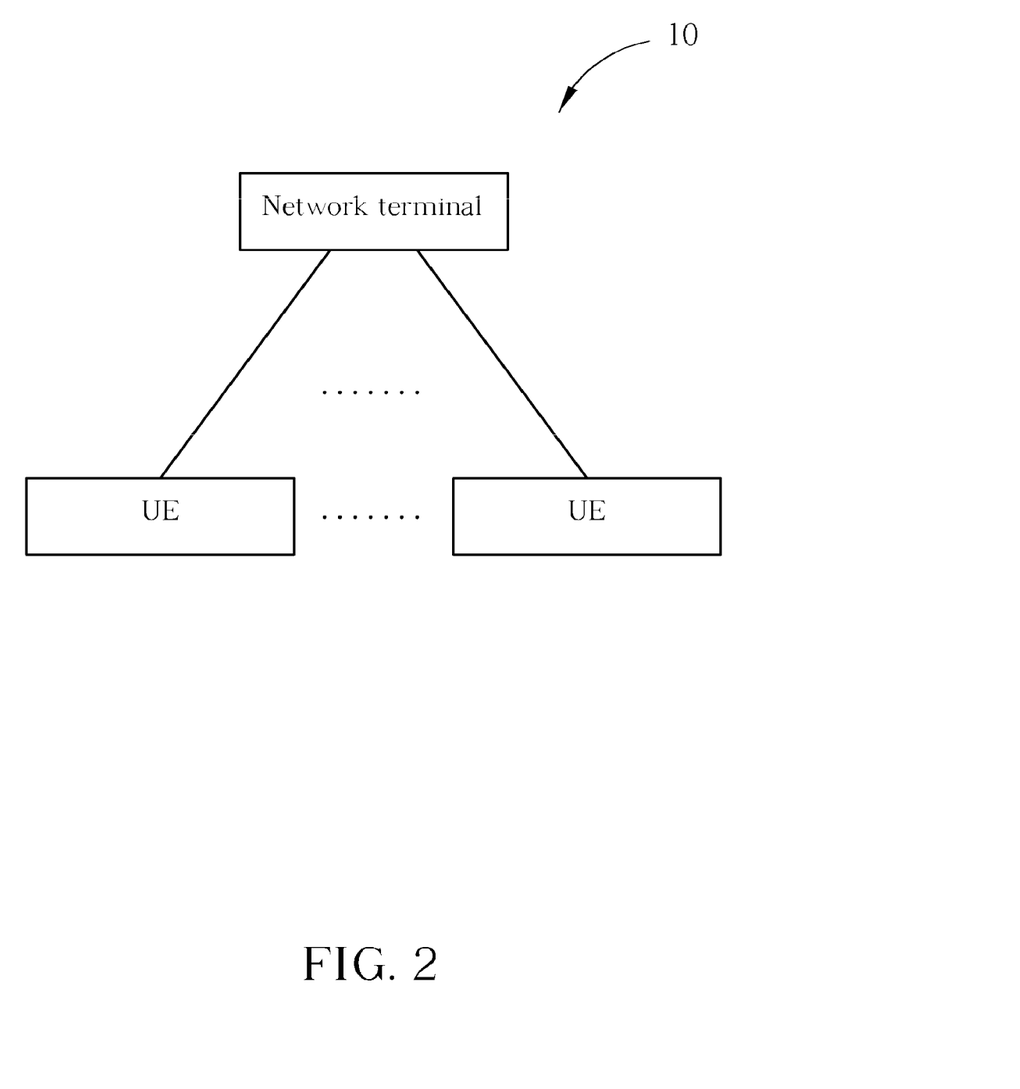
FIG. 2 is a schematic diagram of a wireless communication system.

Please refer to FIG. 2, which is a schematic diagram of a wireless communications system 10. The wireless communications system 10 is preferred to be a Long Term Evolution (LTE) communications system, and is briefly formed with a network terminal and a plurality of user equipments. In FIG. 2, the network terminal and the user equipments are simply utilized for illustrating the structure of the wireless communications system 10. Practically, the network terminal may include a plurality of evolved base stations (eNBs), an evolved UMTS radio access network (EUTRAN) and so on according to actual demands, and the user equipments (UES) can be apparatuses such as mobile phones, computer systems, etc.

Figure 3:
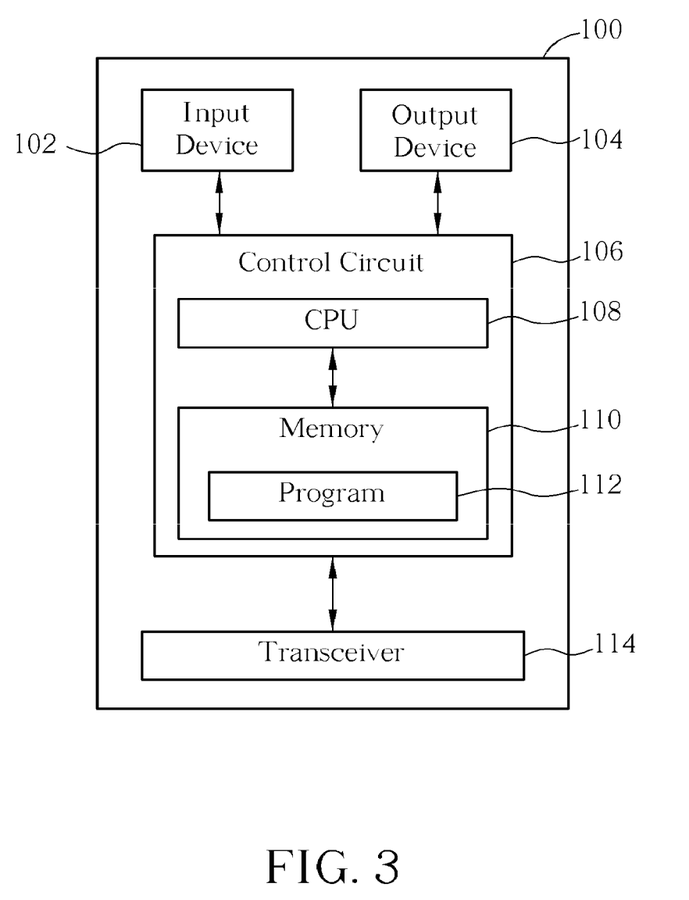
FIG. 3 is a functional block diagram of a wireless communication device.

Please refer to FIG. 3, which is a functional block diagram of a communications device 100. The communications device 100 can be utilized for realizing the UEs in FIG. 2. For the sake of brevity, FIG. 3 only shows an input, device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
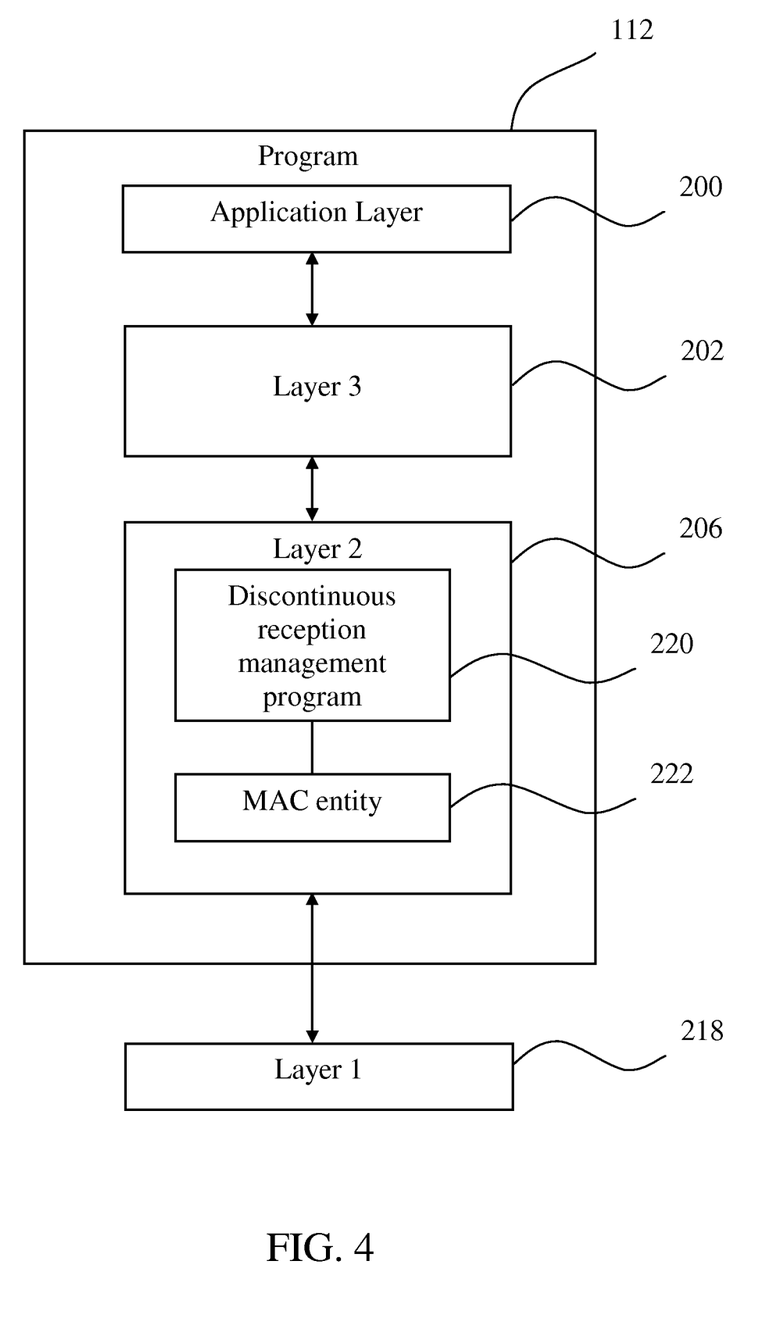
FIG. 4 is a schematic diagram of the program shown in FIG. 3.

Please continue to refer to FIG. 4. FIG. 4 is a schematic diagram of the program 112 shown in FIG. 3. The program 112 includes an application layer 200, a Layer 3 202, and a Layer 2 206, and is coupled to a Layer 1 208. The Layer 2 206 includes a media access control (MAC) entity 222 capable of simultaneously executing multiple Downlink Hybrid Automatic Repeat Request (DL HARQ) processes with a evolved Node-B (eNB) for packet reception and supporting discontinuous reception (DRX).

Figure 5:
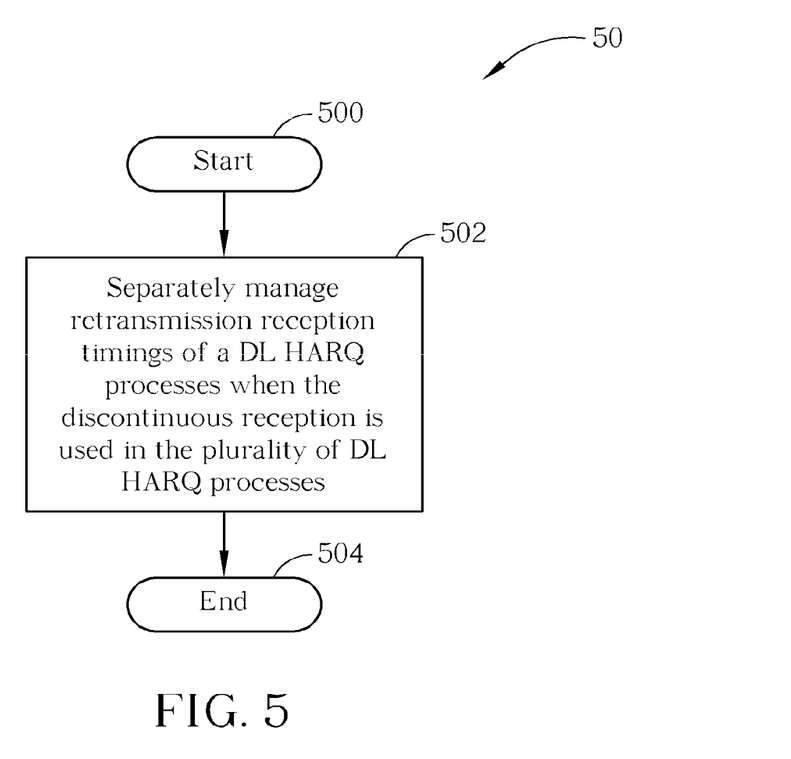
FIG. 5 is a flow chart of a process according to an embodiment of the present invention.

When the MAC entity 222 uses a plurality of DL HARQ processes, a DRX managing program 220 is provided in the program 112 to prevent missing a retransmission packet according to an embodiment of the present invention. Please refer to FIG. 5, which is a flow chart of a process 50 according to an embodiment of the present invention. The process 50 is used for improving discontinuous reception for a UE of a wireless communication system, and can be compiled into the DRX managing program 220. The process 50 includes the following steps:

Step 500: Start.

Step 502: Separately manage retransmission reception timings of a DL HARQ processes when the discontinuous reception is used in the plurality of DL HARQ processes.

Step 504: End.

According to the process 50, the UE separately manages the retransmission reception timings of the plurality of DL HARQ processes when the discontinuous reception is used in the plurality of DL HARQ processes. For example, when one of the plurality of DL HARQ processes receives a retransmission packet, the other DL HARQ processes in need of receiving a retransmission packet do not stop waiting for the corresponding transmission packet.

Preferably, the UE assigns a discontinuous reception (DRX) retransmission timer to each of the plurality of DL HARQ processes. The UE starts the DRY, retransmission timer after a transmission failure of a packet occurs in corresponding DL HARQ process. Furthermore, the UE stops retransmission reception when the DRX retransmission timer expires and a retransmission packet of the packet has not been received yet.

The embodiment of the present invention can solve the problem in FIG. 1. For example, please refer to FIG. 6, which is a schematic diagram of DL HARQ processes A and B managed by a UE according to an embodiment of the present invention. As defined above, the suffixes A and B of the packets 600A and 602B represent exactly which DL HARQ process they belong to, respectively. As known in FIG. 6, when the packet 600A is detected, the UE starts a Round Trip Time (RTT) timer HTR1. When the RRT timer HTR1 expires at time T1, the DRX retransmission timer DRT1 gets started and provides a retransmission reception time T4 for the UE. When the packet 602B is detected, the UE starts a RTT timer HTR2. When the timer HTR2 expires at time T3, the UE starts another DRX retransmission tinier DRT2 according to the process 50, rather than restarts the DRX retransmission timer DRT1. The DRX retransmission timer DRT2 also provides the UE with the same retransmission reception time T4. When a retransmission packet 604A of the packet 600A is received at time T5, the UE stops the DRX retransmission timer DRT1. On the other hand, the DRX retransmission timer DRT2 keeps running and thereby the UE is allowed to detect a retransmission packet of the packet 602B. As can be seen from the above, the retransmission reception timings of the DL HARQ processes A and B are separately managed by the different DRX retransmission timers DRT1 and DRT2, respectively.

Figure 6:
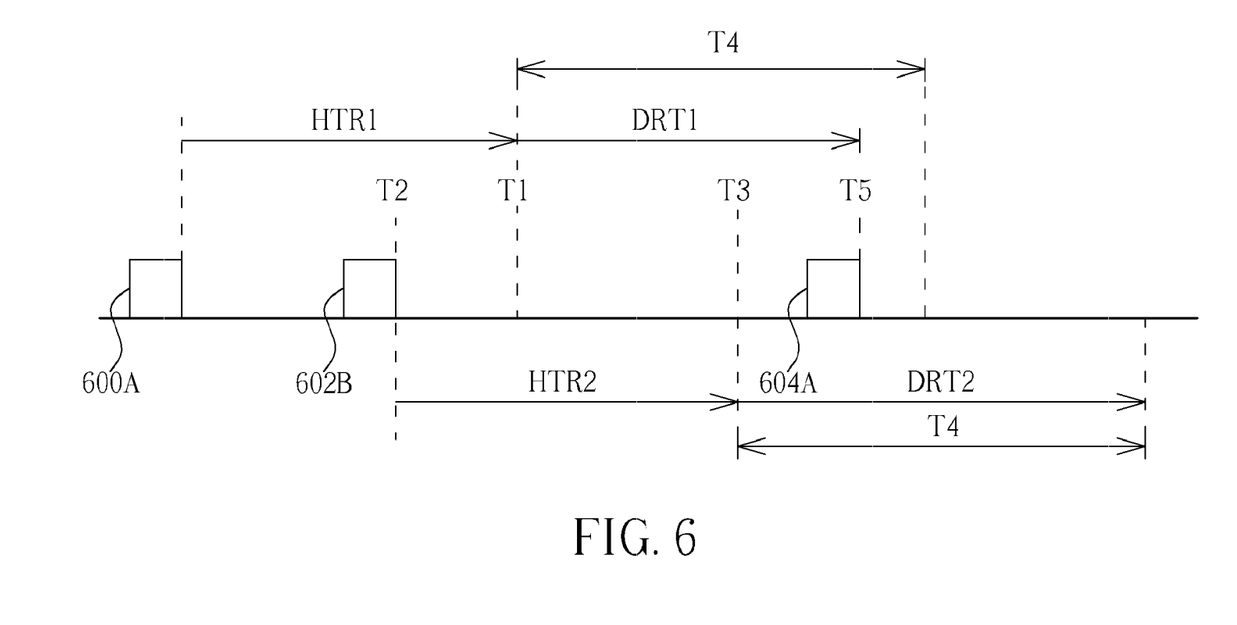
FIG. 6 is a schematic diagram of management of retransmission reception timings.

In the embodiment of the present invention in FIG. 6, a decoding result of the packet 600A or the packet 602B only needs to be obtained no later than the RTT timer expires. Under the condition of a decoding failure, the DRX retransmission timer needs to be activated for retransmission reception. In other words, the UE is aware of the decoding failure of the packet 600A no later than the time T1 and aware of the decoding failure of the packet 602B no later than the time T3.

Figure 7:
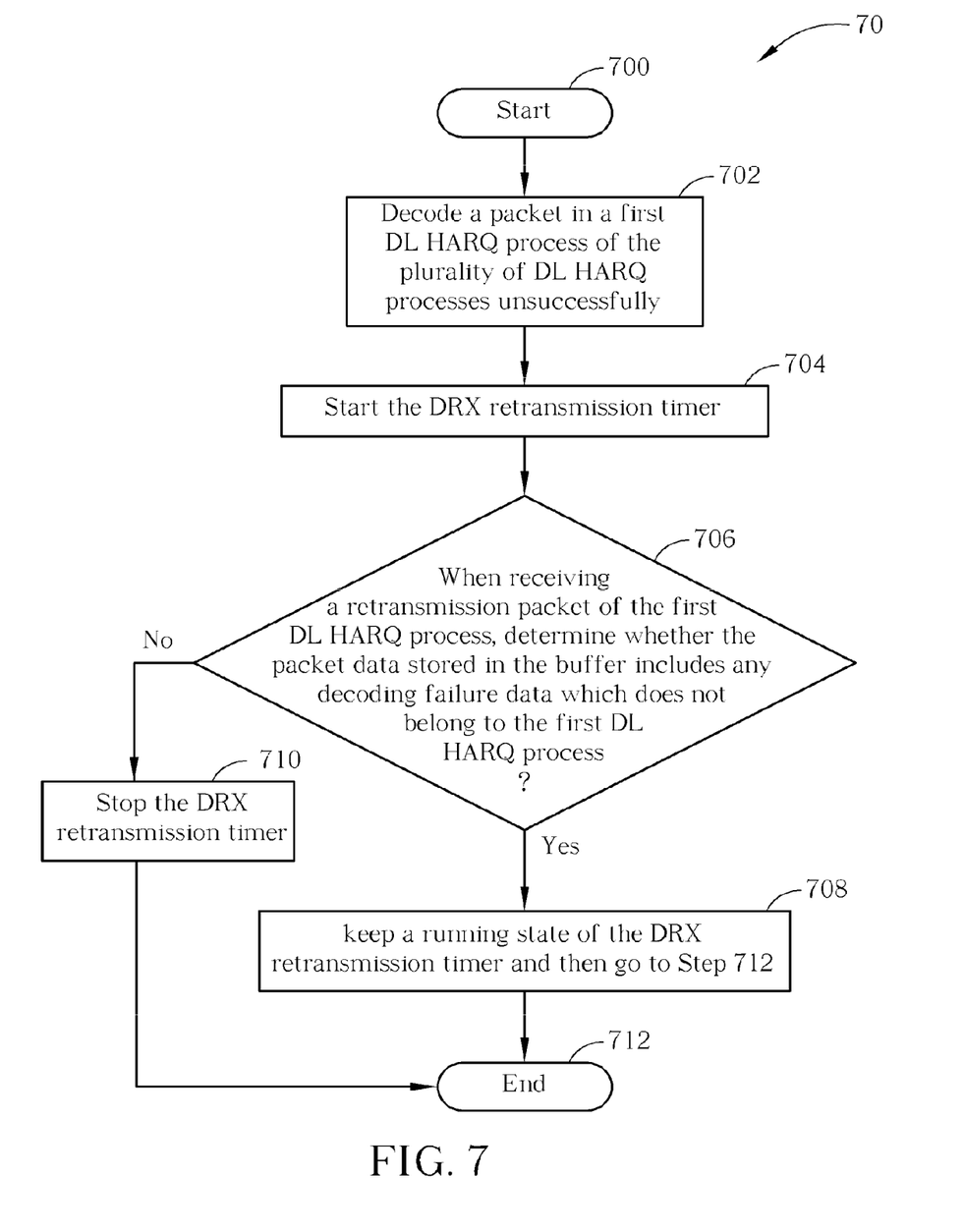
FIG. 7 is a flow chart of a process according to the second embodiment of the present invention.

Please refer to FIG. 7, which is a schematic diagram of a process 70 according to the second embodiment of the present invention. The process 70 is used for improving a discontinuous reception for a LIE of a wireless communication system. The UE controls retransmission reception timings of a plurality of DL HARQ processes by use of a DRX retransmission tinier and stores packet data related to the plurality of DL HARQ processes in a buffer. The process 70 can be compiled into the DRX managing program 220. The process 70 includes the following steps:

Step 700: Start.
Step 702: Decode a packet in a first DL HARQ process of the plurality of DL HARQ processes unsuccessfully.
Step 704: Start the DRX retransmission timer.
Step 706: When receiving a retransmission packet of the first DL HARQ process, determine whether the packet data stored in the buffer includes any decoding failure data which does not belong to the first DL HARQ process?" If so, then go to Step 708: otherwise, go to Step 710.
Step 708: keep a running state of the DRX retransmission timer and then go to Step 712.
Step 710: Stop the DRX retransmission timer.
Step 712: End.

According to the process 70, when decoding failure of a packet occurs in the first DL HARQ process, the UE starts the DRX retransmission timer for executing a retransmission of the first DL HARQ process. During the running state of the DRX retransmission timer, the UE determines whether the packet data stored in the buffer includes any decoding failure data which does not belong to the first DL HARQ process. If so, the UE keeps the running state of the DRX retransmission timer. If not, UE stops the DRX retransmission timer. In the process 70, the UE can know if retransmissions are currently performed for any other DL HARQ processes by determining the packet data stored in the buffer, so as to control the DRX retransmission timer. Besides, the UE enters a standby mode of DRY, function after stopping the DRX retransmission timer.

Figure 8:
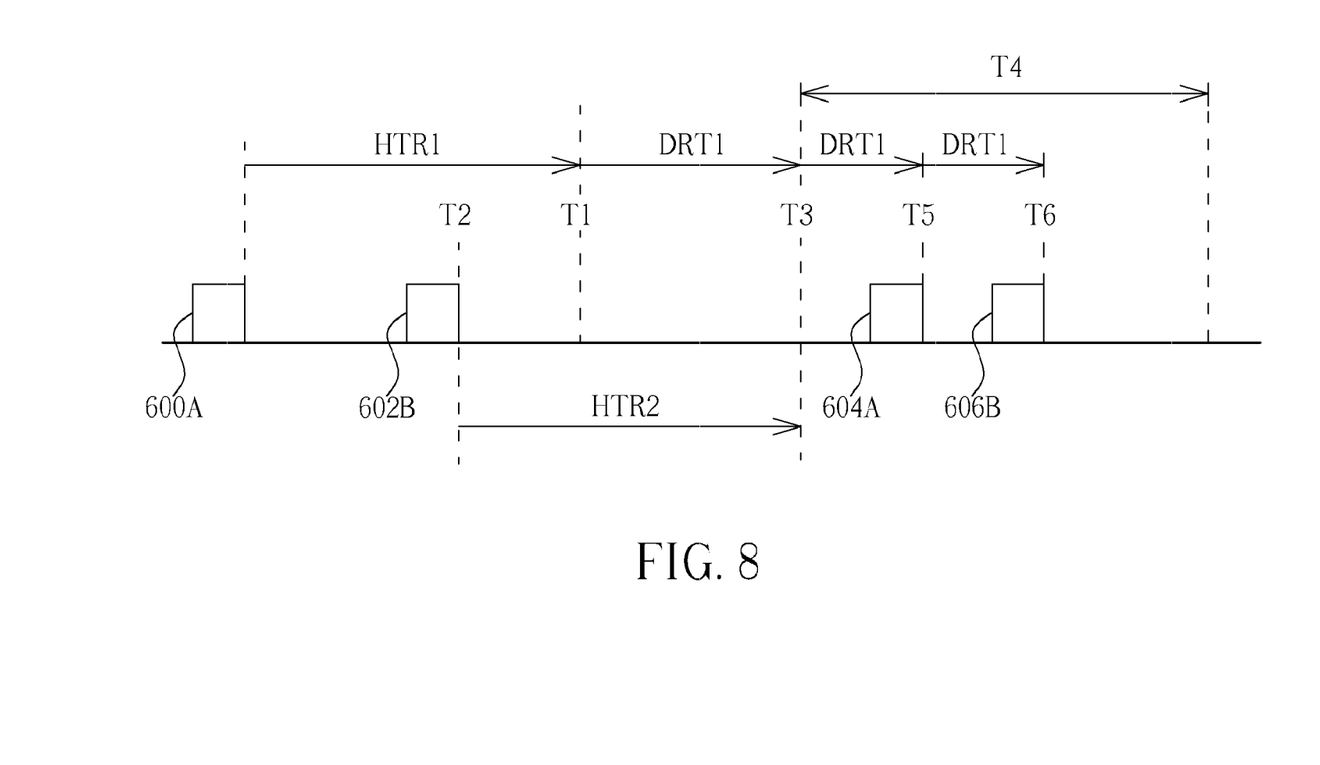
FIG. 8 is a schematic diagram of management of retransmission reception.

The embodiment of the present invention can solve the problem described in FIG. 1. Please refer to FIG. 8, which is a schematic diagram of retransmission reception timings of DL HARQ processes A and B managed by a UE according to an embodiment of the present invention. As defined above, the suffixes A and B of the packet 600A and the packet 602B represent exactly which DL HARQ process they belong to. As known in FIG. 6, when a decoding failure of the packet 600A occurs, the packet 600A is stored in a buffer. Meanwhile, the UE starts a RTT timer HTRT1. When the RTT timer HTRT1 expires at time T1, the DRX retransmission timer DRT1 gets started and provides the UE with a retransmission reception time T4. When a decoding failure of the packet 602B occurs, the LIE stores the packet 602B in the buffer and starts a RTT timer HTR2. Since the UE does not receive the retransmission packet of the packet 600A during the time interval from the time T1 to T3, the DRX retransmission timer DRT1 is restarted at the time T3. When a retransmission packet 604A of the packet 600A is received at time T5, the UE determines whether any decoding failure data which does not belong to the DL HARQ process A is stored in the buffer. In this situation, if the UE determines that decoding failure data of the DL HARQ process B is still stored in the buffer, this means that the DL HARQ process B is waiting for a retransmission packet of the packet 602B. Thus, the DRX retransmission timer DRT1 keeps running. When a retransmission packet 606B of the packet 602B is received at time T6, the UE determines a state of the packet data stored in the buffer again. Since no decoding failure data of the DL HARQ process B is stored in the buffer, the UE stops the DRX retransmission tinier DRT1 and the enters the standby mode. As can be seen from the above, retransmission reception of each DL HARQ process does not mutually affect each other.

In conclusion, the embodiment of the present invention can avoid missing reception of a transmission packet by use of a plurality of DRX retransmission timers or by determining a packet data state of a buffer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving discontinuous reception for a user equipment (UE) of a wireless communication system, the method comprising:
   separately managing, by the UE, retransmission reception timings of a plurality of overlapped downlink hybrid automatic repeat request (DL HARQ) processes when the discontinuous reception is used in the plurality of overlapped DL HARQ processes, wherein the overlapped DL HARQ processes retransmit data during an overlapping or same time period.

2. The method of claim 1, wherein separately managing the retransmission reception timings of the plurality of DL HARQ processes comprises assigning a discontinuous reception retransmission timer (DRX Retransmission Timer) to each of the plurality of overlapped DL HARQ processes.

3. The method of claim 2 further comprising:
   starting the DRX retransmission timer after a transmission failure of a packet occurs in corresponding DL HARQ process; and
   detecting a retransmission packet of the packet before the DRX retransmission timer expires.

4. The method of claim 2 further comprising:
   starting a round trip time timer (RTT timer) corresponding to the DRX retransmission timer when receiving a packet corresponding DL HARQ process; and
   starting the DRX retransmission timer after an expiration of the RTT timer and a decoding failure of the packet.

5. A communication device of a wireless communication system for improving discontinuous reception to prevent missing a retransmission packet, the communication device comprising:
- a processor, for executing a process; and
- a storage device coupled to the processor, for storing a program for executing the process, wherein the process comprises:
    - separately managing retransmission reception timings of a plurality of overlapped downlink hybrid automatic repeat request (DL HARQ) processes when the discontinuous reception is used in the plurality of overlapped DL HARQ processes, wherein the overlapped DL HARQ processes retransmit data during an overlapping or same time period.

6. The communication device of claim 5, wherein separately managing the retransmission reception timings of the plurality of DL HARQ processes comprises assigning a discontinuous reception retransmission timer (DRX Retransmission Timer) to each of the plurality of overlapped DL HARQ processes.

7. The communication device of claim 6, wherein the process further comprises:
- starting the DRX retransmission timer after a transmission failure of a packet occurs in corresponding DL HARQ process; and
- detecting a retransmission packet of the packet before the DRX retransmission timer expires.

8. The communication device of claim 6, wherein the process further comprises:
- starting a round trip time timer (RTT timer) corresponding to the DRX retransmission timer when receiving a packet corresponding DL HARQ process; and
- starting the DRX retransmission timer after an expiration of the RTT timer and a decoding failure of the packet.

* * * * *